United States Patent [19]
Grengg et al.

[11] Patent Number: 5,158,170
[45] Date of Patent: Oct. 27, 1992

[54] AUTOMATIC VIBRATOR CONTROL

[75] Inventors: Walter M. Grengg, Madison; Paul D. Nonn, Deerfield, both of Wis.

[73] Assignee: Resinoid Engineering Corporation, Newark, Ohio

[21] Appl. No.: 796,027

[22] Filed: Nov. 22, 1991

[51] Int. Cl.$^5$ .............................................. B65G 25/00
[52] U.S. Cl. ...................................... 198/751; 198/769; 198/762
[58] Field of Search ................. 198/751, 761, 762, 769

[56] References Cited

U.S. PATENT DOCUMENTS

| | | |
|---|---|---|
| 3,251,457 | 5/1966 | Dumbaugh . |
| 3,840,789 | 10/1974 | Dion . |
| 4,168,774 | 9/1979 | Musschoot . |
| 4,216,416 | 8/1980 | Grace . |
| 4,331,263 | 5/1982 | Brown ........................ 198/751 X |
| 4,369,398 | 1/1983 | Lowry, Sr. ................... 198/751 X |
| 4,594,636 | 6/1986 | Hamer et al. ................ 198/769 X |
| 4,811,835 | 3/1989 | Bullivant et al. ............... 198/762 |
| 5,054,606 | 10/1991 | Musschoot ..................... 198/751 |
| 5,074,403 | 12/1991 | Myhre ............................ 198/751 |

FOREIGN PATENT DOCUMENTS

| | | |
|---|---|---|
| 2913962 | 10/1980 | Fed. Rep. of Germany . |
| 2935739 | 3/1981 | Fed. Rep. of Germany . |
| 0027808 | 2/1982 | Japan ............................. 198/751 |
| 58-193815 | 11/1983 | Japan . |
| 59-36013 | 2/1984 | Japan . |
| 59-39610 | 3/1984 | Japan . |
| 62-27215 | 2/1987 | Japan . |
| 1511185 | 9/1989 | U.S.S.R. ........................ 198/751 |
| 2073915 | 10/1981 | United Kingdom ............ 198/751 |
| 86/02058 | 4/1986 | World Int. Prop. O. ......... 198/751 |

*Primary Examiner*—D. Glenn Dayoan
*Attorney, Agent, or Firm*—Wood, Phillips, Van Santen, Hoffman and Ertel

[57] ABSTRACT

A vibratory apparatus including a vibratory feedbowl, a circuit for providing impulses, and a manually adjustable controller connected to the impulse circuit for providing a controlled conductance path to the impulse circuit to controllably vibrate the feedbowl. An improved controller includes a sensor connected to the vibratory feedbowl for providing a signal proportional to the actual amplitude of the feedbowl. A set point control provides a desired amplitude signal for the feedbowl. An automatic controller connected to the sensor and the set point control provides a control signal proportional to the difference between the desired amplitude and the actual amplitude. An override circuit connecting the automatic controller to the manually adjustable controller provides an override conductance path to the impulse circuit proportional to the control signal to vibrate the feedbowl at approximately the desired amplitude.

16 Claims, 2 Drawing Sheets

AUTOMATIC VIBRATOR CONTROL

FIELD OF THE INVENTION

This invention relates to a vibratory apparatus for a vibratory feed bowl, and particularly to an improved controller which can be retro-fit to a conventional controller, which will maintain a desired amplitude of vibration during load changes and line voltage changes, and which will rapidly attain the desired amplitude of vibration at start-up.

BACKGROUND OF THE INVENTION

Conventional vibratory apparatus for controllably vibrating a feed bowl typically includes a driver power unit which delivers a sequence of impulses to a drive coil or solenoid. The conventional driver power unit typically includes a rheostat which manually controls a magnitude of the impulses delivered to the drive coil to controllably vibrate the feed bowl. The feed bowl typically contains objects which are to be fed- to a work station via a chute.

As the objects exit the feed bowl via the chute, the feed bowl load becomes lighter while the magnitude of the impulses controlled by the rheostat remains the same. As a result, the feed bowl may vibrate at a higher amplitude which increases a feed rate of the feed bowl. An operator must continually adjust the rheostat to obtain a desired constant amplitude of vibration to provide a constant feed rate. Much time and expense would be saved by increasing the capability of an already installed conventional driver power unit through a retro-fit attachment which would provide automatic maintenance of the desired constant vibration amplitude.

Conventional automatic vibratory controllers frequently have a drawback when used with feed bowls designed to mechanically resonate at a frequency selected for maximum efficiency. On starting up, the feed rate undershoots and overshoots a desired steady-state feed rate as capacitive elements of the controller reach steady-state voltages.

SUMMARY OF THE INVENTION

According to a preferred embodiment of the invention, a vibratory apparatus includes a vibratory feedbowl, a means for providing impulses, a drive means for vibrating said feedbowl in response to said impulses, and a manually adjustable control means connected to the impulse means for providing a controlled conductance path to said impulse means to controllably vibrate the feedbowl. A set point means provides a desired amplitude signal of the feedbowl. An automatic control means connected to the sensing means and the set point means provides a control signal proportional to a difference between the desired amplitude and the actual amplitude. An override means connecting the automatic control means to the adjustable controller provides an override conductance path to the impulse means proportional to the control signal to vibrate the feedbowl at approximately the desired amplitude According to one embodiment, the override means includes a diode network having an input connected to a power transistor and an output connected across a first and second terminal of a rheostat. The power transistor is coupled to the automatic control means, and the rheostat, the manual adjustment of the manually adjustable controller, is connected to the impulse means.

According to another embodiment of the present invention, the sensing means includes a first capacitor biased at a first initial voltage at a beginning of a start-up period and a first operating voltage after the start-up period. A first charging means charges the first capacitor to approximately said first operating voltage before the start-up period to reduce the start-up period.

Another feature of the invention is the control signal being optically coupled to the override circuit.

Other objects, features and advantages of the invention will be apparent from the following detailed description taken in connection with the accompanying drawings.

DETAILED DESCRIPTION OF THE INVENTION

Figure 1:
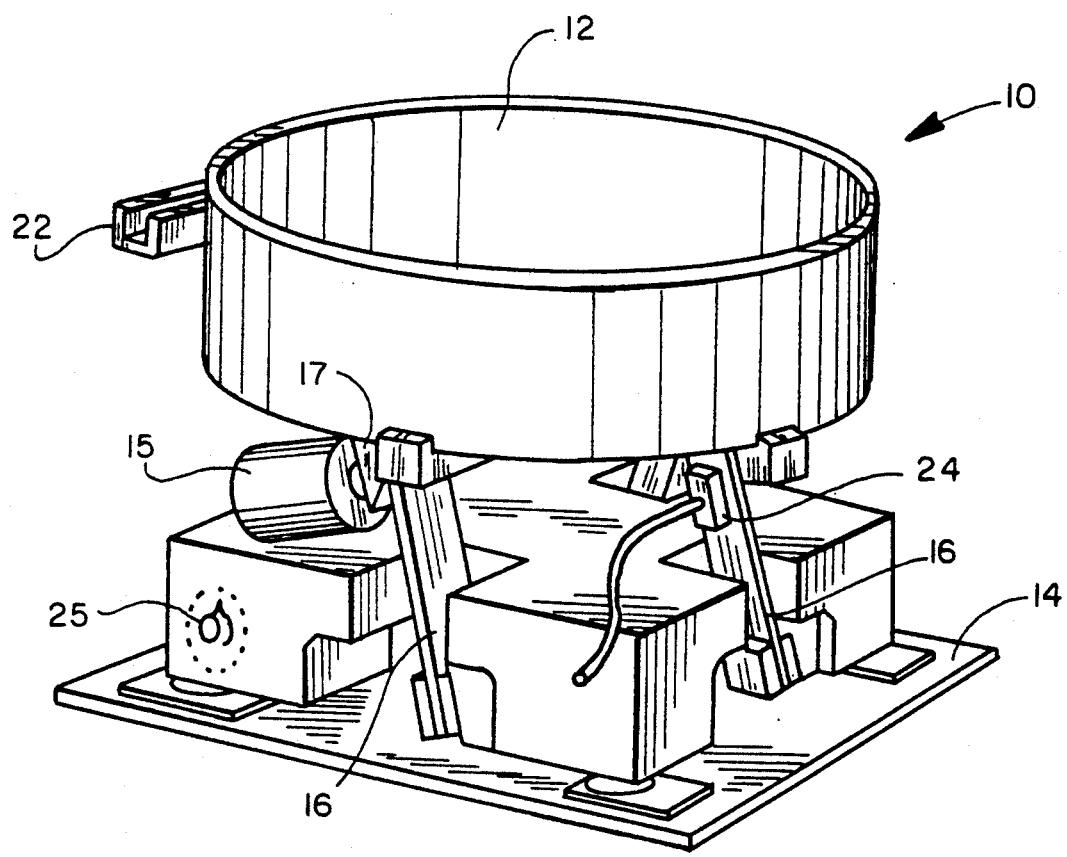
FIG. 1 is a perspective view of a vibratory feeder including the improved controller of the present invention.

In FIG. 1, a vibratory feeder 10 includes a container or bowl 12 for handling parts (not shown). A plurality of springs 16 are each connected pivotally at one end to the bowl 12 and at the other end to a base 14 to support the bowl 12 for oscillating movement A drive coil or solenoid device 15 is mounted to the base 14. When impulsed by an electric (pulse) signal, the coil 15 magnetically attracts an armature 17 associated with the bowl 12 in opposition to the bowl spring 16 to oscillate the bowl 12. At the end of the electric (pulse) signal, the electromagnetic attraction of the bowl 12 is removed and the bowl 12 is returned to its unattracted position under the influence of the spring 16. This sequence is periodically repeated, causing the bowl 12 to vibrate and, thereby, to agitate the piece parts for feeding through a chute 22 to a work station (not shown).

An accelerometer 24 is mounted to the vibratory feeder 10, preferably on the bowl 12, and provides a signal output representative of the amplitude of vibration of the bowl 12. The feeder 10 includes a conventional open loop control using a rheostat controlled by a knob 25 to manually control the amplitude of vibration by controlling electric impulses to the coil 15.

Preferably, accelerometer 24 is an Archer 273-073 piezo electric transducer which is typically used as a tone generator. The transducer has a pill-box shaped housing with a sound outlet located thereon The transducer includes a diaphragm (not shown) mounted inside the housing and a coaxial cable 27 is attached to the transducer. In normal use, a signal input applied to the coaxial cable moves the diaphragm to generate various sounds. However, in the present invention, the pill box housing is attached to the vibrating feedbowl 12 and generates an output signal on the coaxial line 27 proportional to the movement of the diaphragm. Since the vibratory feedbowl vibrates in an alternating clockwise/counter clock-wise direction, the housing must be mounted with a face 26 lying perpendicular to the direction of tangential vibration to allow the diaphragm to respond optimally to the vibratory motion. Preferably the sound outlet is covered with tape to prevent noise from affecting the transducer's output. Alternatively, a higher cost industrial accelerometer can be utilized.

Figure 2:
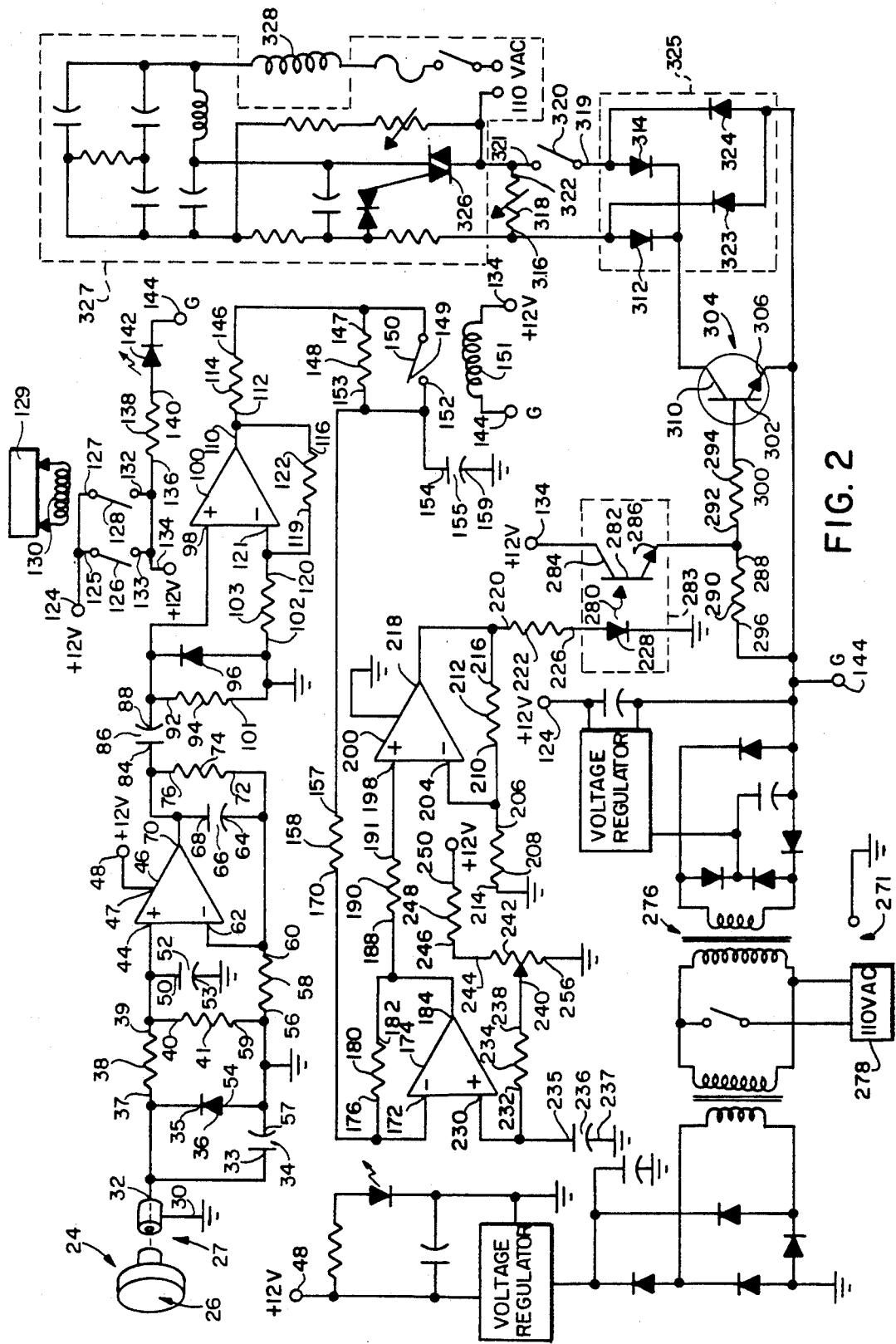
FIG. 2 is an electrical schematic of the controller according to the present invention.

In FIG. 2 an automatic vibrator control 28 according to the present invention is shown One terminal 30 of the accelerometer 24 is connected to ground, while another terminal 32 is connected to a terminal 33 of a 0.01 microfarad capacitor 34, to a cathode 35 of a diode 36 and to a terminal 37 of a 51 Kohm resistor 38 A terminal 42 of a resistor 40 is connected to a non-inverting input 44 of an amplifier 46 (for example quad operational amplifier LM-324N) A power input 47 of the amplifier 46 is connected to a first 12 volt source 48. A terminal 50 of a 0.001 microfarad capacitor 52. A terminal 53 of the capacitor 52 is connected to ground. An anode 54 of the diode 36 is connected to ground, to a terminal 57 of the capacitor 34 and to a terminal 56 of a 100 Kohm resistor 58. A 220 Kohm resistor 59 is connected to the cathode 36 and the anode 54 of the diode 37. A terminal 60 of the resistor 58 is connected to an inverting input 62 of the amplifier 46 and to a terminal 64 of a 0.01 microfarad capacitor 66. A terminal 68 of the capacitor 66 is connected to an output 70 of the amplifier 46. The terminal 64 of the capacitor 66 is also connected to a terminal 72 of a 100 Kohm resistor 74. A terminal 76 of the resistor 74 is connected to the output 70 of the amplifier 46 and to a terminal 84 of a 2.2 microfarad capacitor 86.

A terminal 88 of the capacitor 86 is connected to a terminal 92 of a 47 Kohm resistor 94, a cathode of a diode 96, and a non-inverting input 98 of an amplifier 100. A terminal 101 of the resistor 94 is connected to ground, an anode of a diode 96, and a terminal 102 of a 10 Kohm resistor 103. An output 110 of the amplifier 100 is connected to a terminal 112 of a 10 Kohm resistor 114 and a terminal 116 of a 100 Kohm resistor 122. A terminal of the resistor 122 is connected to a terminal 120 of the resistor 103 and to an inverted input 121 of the amplifier 100.

A second 12 volt source 124 is connected to a terminal 125 of a manual Run/Stop switch 126 and to a terminal 127 of a remote control relay contact 128. A photocell-controlled 110 v AC source 129 provides a voltage across a coil 130 to selectively close the relay contact 128. A terminal 132 of the remote control relay contact 128 is connected to a terminal 133 of the Run/Stop switch 126, and a terminal 136 of a 470 ohm resistor 138. A terminal 140 of the resistor 138 is connected to an anode of a light emitting diode (LED) 142. A cathode of the LED 142 is connected to a power supply ground 144.

A terminal 146 of the resistor 114 is connected to a terminal 147 of a 33 Kohm resistor 148 and to a terminal 149 of a normally open 150 contact of a relay 151. The relay 151 is connected between the 12 volt source 134 and the power supply ground 144. A terminal 152 of the contact 150 is connected to a terminal 153 of the resistor 148, to a terminal 154 of a 400 microfarad capacitor 155 and to a terminal 157 of a 7.6 Kohm resistor 158 A terminal 159 of the capacitor 155 is connected to ground.

A terminal 170 of the resistor 158 is connected to an inverting input 172 of an amplifier 174 and to a terminal 176 of a 100 Kohm resistor 180. A terminal 182 of the resistor 180 is connected to an output 184 of the amplifier 174 and to a terminal 188 of a 24 Kohm resistor 190. A terminal 191 of the resistor 190 is connected to a non-inverting input 198 of an amplifier 200.

An inverting input 204 of the amplifier 200 is connected to a terminal 206 of a 10 Kohm resistor 208 and to a terminal 210 of a 100 Kohm resistor 212. A terminal 214 of the resistor 208 is connected to ground A power input 215 of the amplifier 200 is connected to ground. A terminal 216 of the resistor 212 is connected to an output 218 of the amplifier 200 and to a terminal 220 of a 1 Kohm resistor 222. A terminal 226 of the resistor 222 is connected to an anode of a light-emitting diode (LED) 228. A cathode of LED 228 is connected to ground.

A non-inverting input 230 of the amplifier 174 is connected to a terminal 232 of a 33 Kohm resistor 234 and to a terminal 235 of a 0.22 microfarad capacitor 236. A terminal 237 of the capacitor 236 is connected to ground. A terminal 238 of the resistor 234 is connected to an adjustable terminal 240 of a 10 Kohm potentiometer 242.

A terminal 244 of the potentiometer 242 is connected to a terminal 246 of a 150 Kohm resistor 248. A terminal 250 of the resistor 248 is connected to the first 12 volt source 48. A terminal 256 of the potentiometer 242 is connected to ground.

A power supply circuit 271 provides the first 12 volt source signal at the terminal 48 and the second 12 volt source signal at the terminal 124. The first 12 volt source signal at the terminal 48 is electrically isolated from the second 12 volt source signal at the terminal 124 via a transformer 276. The power supply circuit 271 is connected to a 110 volt AC source 278.

The LED 228 emits photons 280 at a rate dependent upon the current flowing through the LED 228. The photons 280 illuminate a base of a phototransistor 282. The LED 228 and the photo transistor 282 operate as a conventional optocoupler 283 (for example GE 4N27). A collector 284 of the phototransistor 282 is connected to the 12 volt source 134 (at 12 volts). An emitter 286 of the phototransistor 282 is connected to a terminal 288 of a 1.2 Kohm resistor 290 and a terminal 292 of a 51 Kohm resistor 294.

A terminal 296 of the resistor 290 is connected to the power supply ground 144. A terminal 300 of the resistor 294 is connected to a base 302 of a power transistor 304 (for example RCA 2N3439). An emitter 306 of the transistor 304 is connected to the power supply ground 144.

The collector 310 of the transistor 304 is connected to a cathode of a diode 312 and a cathode of a diode 314. An anode of the diode 312 is connected to a terminal 316 of a conventional rheostat controller 318. An anode of the diode 314 is connected to a terminal 319 of an enable switch 320. A terminal 321 of the enable switch 320 is connected to a terminal 322 of the conventional rheostat controller 318. The power supply ground 144 is connected to an anode of a diode 323 and an anode of a diode 324. A cathode of the diode 323 is connected to the input 316 of the conventional rheostat controller 318. A cathode of the diode 324 is connected to the terminal 319 of the enable switch 320. The diodes 312, 314, 322 and 324 form a diode network 325. The effect of either the transistor 304 with the diode network 325 or the conventional rheostat 318 is to vary the conductivity between terminal 316 and 322 to vary the gating of a triac 326 in a standard impulse circuit 327. By varying the gating of the triac 326, the impulses provided to a drive coil 328 by the impulse circuit 327 controllably vibrate the feedbowl. The rheostat 318 manually adjusts a resistor and provides a controlled conductance path which varies the gating of the triac 326 of the standard impulse circuit 327. However, the present invention varies the conductivity in a closed loop fashion. When the rheostat 318 is set to "zero amplitude", it is set to its maximum resistance. When rheostat 318 is moved to the "zero amplitude" setting, the diode network 325 overrides the effect of the rheostat 318 and provides an override conductance path. Alternatively, the rheostat 318 may be completely removed from this circuit.

Note that the voltage at the terminal 134 provides the current for the base 302 of the power transistor 304 via the photo transistor 282. The voltage at terminal 134 is isolated from the voltage at terminal 48 by the transformer 276 to prevent high voltage surges associated with the drive circuit 327 from destroying amplifiers 46, 100, 174, 200 and other elements of the automatic control circuit 28.

In use, the accelerometer 24 is fastened to the bowl 12 and provides a signal proportional to the amplitude of vibrational movement of the bowl 12 when the Run/Stop switch 126 is in the Run position. The diode 36 transforms the signal from the accelerometer 24 into a series of positive pulses which are input to the amplifier 46. The capacitor 52 and resistor 38 filter undesirable high frequency noise from parts falling inside the bowl 12. The amplifier 46 amplifies the signal from the accelerometer 24. The capacitor 86 couples the accelerometer signal to the amplifier 100 which filters noise from the accelerometer signal and again amplifies the accelerometer 24 signal.

When the Run/Stop switch 126 is closed, the contacts 150 are closed and the amplifier 100 builds a charge on the capacitor 155 which represents a DC average amplitude of the vibration of the bowl 12. The DC average amplitude signal is transmitted via the resistor 158 to the inverting input 172 of the amplifier 174.

The potentiometer 242 sets the desired amplitude of the bowl and provides a desired amplitude signal which is transmitted to the non-inverting input 230 of the amplifier 174. The amplifier 174 provides a control signal proportional to the difference between the DC average amplitude of vibration of the bowl 12 (stored on capacitor 155) and the desired amplitude signal set by the potentiometer 242.

If the DC average amplitude of vibration at the inverting input 172 of the amplifier 174 is less than the desired signal at the input 230 of the amplifier 174 (indicating that the actual amplitude of vibration of bowl 12 is less than desired), the control signal from the amplifier 174 increases and is applied to the input 198 of the amplifier 200. The output 218 of the amplifier 200 drives a current through the resistor 222 and the LED 228 of the optocoupler 283. Light from the LED 228 controls the current flowing through the phototransistor 282.

Part of the current from the phototransistor 282 flows via the resistor 294 to the base 302 of the power transistor 304. The current flowing into the base 302 determines the conductivity of the path between the collector 310 and emitter 306 (connected to node 144).

The power transistor 304 and the diode network 325 provide an override conductivity by forming a controlled variable resistance which simulates the effect of the conductivity of the conventional rheostat control 318. When the automatic vibrator control 28 is in use, the conventional rheostat control 318 is set to maximum resistance (approximating an open circuit). The automatic controller 28 provides override means in the form of the power transistor 304 and diode network 325 when the manual control has been set to "zero amplitude", so that said override means will automatically control the drive circuit 327. As can be understood, the manual control can be utilized when the automatic control 28 is not in use. Further, the automatic control 28 can be retrofit to conventional vibratory controllers. Alternatively, the conventional controller can be removed entirely and replaced by the circuit of FIG. 2 with rheostat 318 not included The automatic vibrator control 28 also includes a means for injecting charges onto the capacitor 155 when the Stop/Run switch 126 is in the Stop (or open) position so that when the switch 126 is moved into the Run (or closed) position, the automatic controller can operate immediately without an undesirable transient period.

When the switches 126 and 128 are open, the circuit 28 is in a stand-by state and the 12 volt signal from the source 124 is not applied to the power input 134 of the phototransistor 282. The drive circuit 327 is not activated and there is no output from the accelerometer 24. As a result, amplifier 100 has no output. Consequently, the capacitor 155 is not receiving charge from its usual running source (the output 110 of the amplifier 100). However, the charge on the capacitor 155 is maintained at a voltage proportional to the voltage set by the potentiometer 242. The voltage of the potentiometer 242 is applied through the non-inverting input 230 of the amplifier 174. Current from the amplifier output 184 is applied to the resistor 180 and the resistor 158 to charge the capacitor 155. Since neither of the switches 126, 128 are closed, the relay 151 is not energized and the contacts 150 are open. The resistor 148, which is normally short-circuited during operation, is now in series with the resistors 114, 158 and 180. The resistors 114, 158 and 180 form a voltage divider network which maintains the desired charge on the capacitor 155. The voltage of the potentiometer 242 is a high voltage when a large vibration amplitude is desired and a low voltage when only a small vibration amplitude is desired.

When the Stop/Run switch 126 is moved into the Run position (or switch 128 is closed), the 12 volt signal from the second voltage source 124 is applied to the power input 134 of the phototransistor 282 and to the relay 151 to close the contact 150 and short the resistor 148. The charge on the capacitor 155 (charged according to the setting of the potentiometer 242) is modified by the initial amplitude of vibration and the automatic vibrator control 28 quickly brings the amplitude of vibration to its desired value.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a vibratory apparatus including a vibratory feed bowl, a means for providing impulses, a drive means for vibrating the feed bowl in response to said impulses and a manually adjustable control means connected to said impulse means for providing a controlled conductance path to said impulse means to controllably vibrate said feed bowl, an improved controller comprising:

sensing means connected to the vibratory feed bowl for providing the signal proportional to the actual amplitude of the vibratory feed bowl;

set-point means for providing a desired amplitude signal of the feed bowl;

automatic control means connected to the sensing means and the set-point means for providing a control signal proportional to a difference between the desired amplitude and the actual amplitude; and override means connecting said automatic control means to the manually adjustable control means for providing an override conductance path to said impulse means proportional to said control signal to vibrate said feed bowl at approximately the desired amplitude.

2. The improved vibratory feed bowl controller of claim 1, wherein the control signal is optically coupled to the override means.

3. The improved vibratory feed bowl controller of claim 1 wherein one of said sensing means and said set-point means includes a first capacitor biased at a first initial voltage at a beginning of a start-up period and a first operating voltage after the start-up period.

4. The improved vibratory feed bowl controller of claim 3 further including a first charging means for charging said first capacitor to approximately said first operating voltage before the start-up period to reduce said start-up period.

5. The improved vibratory feed bowl controller of claim 1 wherein the override means includes a diode network having an input connected to a power transistor and an output connected across a first and second terminal of a rheostat, said power transistor being coupled to said control signal means, said first and second terminal of said rheostat being connected to the impulse means.

6. The improved vibratory feed bowl controller of claim 5 wherein said diode network includes:
   a first diode having a cathode connected to a collector of the power transistor said first diode having an anode connected to the first terminal of the rheostat;
   a second diode having a cathode connected to the collector, said second diode having an anode connected to the second terminal of the rheostat;
   a third diode having its anode connected to an emitter of the power transistor said third diode having a cathode connected to said first terminal of the rheostat; and
   a fourth diode having its anode connected to the emitter of the power transistor said fourth diode having a cathode connected to said second terminal of the rheostat.

7. The improved vibratory feed bowl controller of claim 1, wherein the sensing means is an accelerometer.

8. The improved vibratory feed bowl controller of claim 1, wherein the actual amplitude signal from the sensing means is a time averaged amplitude signal.

9. The improved vibratory feedbowl controller of claim 1, wherein said sensing means is a piezo electric transducer having a diaphragm and a sound outlet, said transducer being attached to said vibratory feedbowl such that said diaphragm is perpendicular to a direction that said vibratory feedbowl vibrates to displace the diaphragm and to provide the signal proportional to the actual amplitude of the vibratory feedbowl.

10. The improved vibratory feedbowl controller of claim 9 further including a means for blocking said sound outlet to minimize noise effects.

11. A controller for a vibratory apparatus including a vibratory feed bowl, a means for providing impulses, a drive means responsive to said impulses for controllably vibrating the vibratory feed bowl, said controller comprising:
   sensing means connected to the vibratory feed bowl for providing a signal proportional to the actual amplitude of the vibratory feed bowl, said sensing means including a first capacitor biased at a first initial voltage at a beginning of a start-up period and a first operating voltage after the start-up period;
   set-point means for providing a desired amplitude signal of the feed bowl;
   automatic control means connected to the sensing means and the set-point means for providing a control signal proportional to a difference between the desired amplitude and the actual amplitude to said impulse means; and
   a first charging means for charging said first capacitor to approximately said first operating voltage before the start-up period to reduce said start-up period.

12. The improved vibratory feed bow controller of claim 11 wherein the sensing means is an accelerometer.

13. The improved vibratory feed bowl controller of claim 11 wherein the actual amplitude signal from the sensing means is a time averaged amplitude signal.

14. The improved vibratory feed bowl controller of claim 11 wherein the control signal from said automatic control means is coupled to a base of a power transistor.

15. The improved vibratory feed bowl controller of claim 14 further including a diode network having an input and an output, said input being connected to at least one of the emitter and the collector of said power transistor and said output being connected to said impulse means.

16. The improved vibratory feed bowl controller of claim 14 wherein said control signal is optically coupled to said power transistor.

* * * * *